United States Patent [19]

Ohr et al.

[11] 3,929,521

[45] Dec. 30, 1975

[54] SOLUBILIZATION OF CHROMATE SALTS IN ORGANIC MEDIA

[75] Inventors: Jack Ohr; Kenneth G. Clark, both of Warminster, Pa.

[73] Assignee: The United States of America as represented by the Secretary of the Navy, Washington, D.C.

[22] Filed: Oct. 2, 1974

[21] Appl. No.: 511,328

[52] U.S. Cl. .................. 148/6.2; 106/14; 260/340.3

[51] Int. Cl.[2] .............................................. C23F 7/26

[58] Field of Search ........ 148/6.2; 252/396; 106/14; 260/340.3

[56] References Cited

UNITED STATES PATENTS

| | | | |
|---|---|---|---|
| 3,437,531 | 4/1969 | Svadlenak | 148/6.2 |
| 3,546,318 | 12/1970 | Vest | 260/340.3 X |
| 3,686,225 | 8/1972 | Pedersen | 260/340.3 |
| 3,687,978 | 8/1972 | Pedersen | 260/340.3 |

*Primary Examiner*—Ralph S. Kendall
*Attorney, Agent, or Firm*—R. S. Sciascia; Henry Hansen

[57] ABSTRACT

A process for solubilizing the chromate ion in non-polar organic media. The hexavalent chromium ion, being the best known corrosion inhibitor for aluminum and steel, is dissolved in appropriate low polarity, organic solvents such as paint coatings and removers and lubricants. A 0.1 molar solution of potassium dichromate in water is prepared and the pH of the solution adjusted to approximately 1.0 with hydrochloric acid. An equal volume of a methylene chloride solution is prepared in which the following compound is 0.01 molar: dicyclohexyl-18-crown-6 macrocyclic polyether. The two immiscible solutions are then shaken for a few seconds. The organic solution now contains the hexavalent chromium ion in a concentration of 0.01 molar. After the two solutions have separated, the organic phase is removed and 100 milliliters are added, for example, to a quart of wet paint immediately prior to its application. The resultant coating contains a hexavalent chromium concentration of more than 0.001 molar, more than sufficient for corrosion inhibition.

27 Claims, No Drawings

SOLUBILIZATION OF CHROMATE SALTS IN ORGANIC MEDIA

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to the field of metal coatings and more particularly to chromium containing metal coatings.

The hexavalent chromium ion is superior to any known corrosion inhibitor for providing corrosion protection to aluminum and steel, as well as many other metals. However, for this ion to perform its inhibitive function, it must first be released from the salts in which it naturally occurs, such as potassium, sodium, zinc, etc., by dissolving the particular salt in an appropriate solvent. Water is the only common solvent in which these salts have any appreciable solubility. The significance of this fact in the field of coatings technology has been that paint coatings which would otherwise be suitable for direct application to metals must be applied over specially formulated primer systems to protect against corrosion. The use of primer systems (sometimes including two primers—a wash primer and an intermediate primer) involves additional costs of man-hours and materials, not to mention the long delays in permitting the primer system to dry prior to the application of the top coat. Primer coatings contain high concentrations of dispersed (not dissolved) chromate salts, which protect against corrosion by dissolving from the film and being deposited into potentially corrodable areas on the metal. Heretofore, chromate salts were not able to be dissolved directly into paints, thinners, lubricants or any other non-polar organic media.

SUMMARY OF THE INVENTION

Accordingly, it is a general purpose and object of the present invention to provide a process for dissolving salts containing hexavalent chromium ion in low polarity organic media such as paints, paint thinners and lubricants, for example. It is another object to produce corrosion inhibiting paint coatings by having the hexavalent chromium ion dissolved therein. It is yet a further object to provide a process for coating metal surfaces to provide protection against corrosion. It is still a further object to provide metal coating solutions having significantly less hexavalent chromium ion than found in conventional primer systems.

These and other objects are accomplished according to the present invention by an organic solution which can be added to a particular coating prepared by contacting an essentially 0.1 mol to saturated aqueous solution of hexavalent chromium-containing potassium salt having an acidic pH with an essentially 0.0004 mol to 0.7 mol solution of 18-crown macrocyclic polyether in a low polarity organic solvent.

DESCRIPTION OF THE PREFERRED EMBODIMENT

The chemical method of solubilizing hexavalent chromium (Cr VI) salts in low polarity organic solvents is similar to the procedures of C. J. Pedersen, J. Amer. Chem. Soc. 89, 7017 (1967); Ibid, 89, 2495 (1967); Ibid, 92, 391 (1970); and Ibid, 92, 386 (1970), but departs from it in the present invention in that pH control is required in the preparation. A general description of the method employed and an explanation of the terms used follows.

Generally, an aqueous solution of a salt containing hexavalent chromium (Cr VI) is prepared and adjusted to an acidic pH (e.g., pH = 7 or less) with a suitable acid. An organic solution of a macrocyclic polyether is prepared in a suitable low polarity organic solvent, and the two immiscible solutions are brought into contact and then separated. The preparation may be represented in schematic equation form as follows:

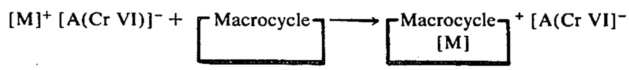

where, $[M]^+$ is the cation of the salt, $[A(Cr\ VI)]^-$ is the anion containing hexavalent chromium, and the organic species is a generalized macrocyclic polyether:

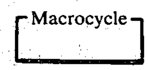

Of major importance in the preparation of the macrocyclic polyether complex are the following:

a. Macrocycle
   1. The polyether ring must be of the correct size to accommodate the particular cation being used (i.e., K, Na, Zn, etc.) during complexation. For example, the potassium (K) cation is best complexed by the 18-crown polyether rings, and the sodium (Na) cation by the 15-crown polyether rings.
   2. The substitution of alkyl or aryl groups onto the polyether ring changes the solubility characteristics of the complex. For example, the dibenzo-18-crown-6 complex is only slightly soluble in methylene chloride, whereas the 18-crown-6 complex is very soluble in the same solvent.
   3. Substitution also affects the ability of the complex to form a crystalline solid. Dibenzo-18-crown-6 will form a crystalline solid complex, but dicyclohexyl-18-crown-6 will not.

b. Hexavalent Chromium (Cr VI)—Containing Salt
   1. As noted in (a)(1) above, the cation (i.e., K) should correspond to the polyether ring size.
   2. The anion of the salt is any oxygenated form of hexavalent chromium (e.g., $Cr_2O_7^=$, $CrO_4^=$, etc.).

c. Concentrations
   1. Aqueous solutions of the salt containing hexavalent chromium are most effective in the 0.1 molar to saturation range, but lower concentrations may be used.
   2. Organic solutions of the macrocycle are most effective in the 0.001 molar to 0.7 molar range, but higher concentrations will also yield the desired complex.

d. pH Adjustment

1. The following acids were found suitable, although other acids may also be equally effective, since the only function of the acid is the lowering of pH: nitric acid ($HNO_3$), sulfuric acid ($H_2SO_4$), chromic acid ($CrO_3$), and hydrochloric acid (HCl).
2. The pH of the aqueous solution should be acidic (i.e., less than 7). It has been found that the lower the pH, the higher the extraction coefficient; that is, the greater the fraction of macrocycle existing in the complexed form.

e. Organic Solvent

1. With regard to the organic solvent into which the hexavalent chromium is extracted, methylene chloride has been found acceptable although other organic solvents for organic protective coatings may also be used (e.g., toluene).

Following are a number of experimental preparations. The results are expressed as a quantitative percentage of macrocycle in complex form as determined from spectrophotometric analysis of the organic solution.

EXAMPLE 1

A 0.1 molar solution of potassium dichromate ($K_2Cr_2O_7$) in water was prepared, and the pH of the solution adjusted to approximately 1.0 with hydrochloric acid (HCl). A methylene chloride ($CH_2Cl_2$) solution was prepared in which the following compound was 0.01 molar: dicyclohexyl-18-crown-6 macrocyclic polyether. This trivial name appears in the chemical literature for these types of compounds. The precise chemical designation, which may be found in Pedersen's original articles (supra) is 2, 5, 8, 15, 18, 21-hexaoxatricyclo [$20.4.0.0^{9,14}$] hexacosane. Approximately equal volumes of the two immiscible solutions were brought into contact in a container and shaken for a few seconds. The organic solution now contained the Cr VI ion in a concentration of 0.01 molar. After the two solutions were separated, the organic phase was removed and added to a wet paint system as follows: 100 milliliters of organic solution was added to each quart of wet paint just prior to application by brush or spray. This proportion corresponds to a hexavalent chromium concentration of more than 0.001 molar, which has been postulated to be more than sufficient for corrosion inhibition, as described by H. H. Uhlig, *Corrosion and Corrosion Control*, Sec.Ed, John Wiley and Sons, New York (1971). To explain the molecular phenomenon more completely, a macrocycle is a complex compound which is in the shape of a ring. The hexavalent chromium salt is a solid combination of ions in which the cations (e.g., potassium-K) and anions (e.g., chromate-$CrO_4$) are arrayed in a definite lattice form, the cation having a positive charge and the anion having a negative charge. To separate the salt ions, a high-polarity liquid such as water, for example, is necessary. However, organic solvents such as benzene, toluene and methylene chloride, for example, exhibit low polarity. Therefore the chromate anion must be separated from the salt in some other manner. Since the macrocycle complex is shaped in the form of a ring having a particular diameter, and the ring has electronegative oxygen atoms, the potassium (K) cation is attracted into the center of the ring while the now-liberated chromate anion with its negative charge remains outside of the complexed ring as the anionic partner to preserve electroneutrality. Upon separation of the phases, the chromium-containing organic phase may be added to the various organic coating substances to provide corrosion protection to metal surfaces as described above.

EXAMPLE 2

A 0.1 molar solution of potassium chromate ($K_2CrO_4$) in water was prepared, and the pH of the solution adjusted to approximately 1.1 with HCl. A 0.001 molar solution of methylene chloride and dibenzo-18-crown-6 macrocyclic polyether was prepared, and approximately equal volumes of the two immiscible solutions were brought into contact and shaken for a few seconds. The organic solution now contained 50% of the complex macrocycle containing chromate ion as determined by spectrophotometric analysis.

EXAMPLE 3

A 0.5 molar solution of $K_2CrO_4$ in water was prepared, and the pH of the solution adjusted to approximately 0.55 with HCl. A 0.001 molar solution of methylene chloride and dibenzo-18-crown-6 macrocyclic polyether was prepared, and approximately equal volumes of the two immiscible solutions were brought into contact and shaken for a few seconds. The organic solution now contained 100% of macrocycle in complex form.

EXAMPLE 4

A 0.5 molar solution of $K_2CrO_4$ in water was prepared, and the pH of the solution adjusted to approximately 0.8 with $HNO_3$. A 0.001 molar solution of methylene chloride and dibenzo-18-crown-6 macrocyclic polyether was prepared, and approximately equal volumes of the two immiscible solutions were brought into contact and shaken for a few seconds. The organic solution now contained crystals of complex macrocycle.

EXAMPLE 5

A 0.5 molar solution of $K_2CrO_4$ in water was prepared, and the pH of the solution adjusted to approximately 4.1 with HCl. A 0.001 molar solution of methylene chloride and dibenzo-18-crown-6 macrocyclic polyether was prepared, and approximately equal volumes of the two immiscible solutions were brought into contact and shaken for a few seconds. The organic solution now contained 9% of macrocycle in complex form.

EXAMPLE 6

A 0.6 molar solution of $K_2CrO_4$ in water was prepared, and the pH of the solution adjusted to approximately 0.4 with HCl. A 0.01 molar solution of dibenzo-18-crown-6 macrocyclic polyether in methylene chloride was prepared, and approximately equal volume of the two immiscible solutions were brought into contact and shaken for a few seconds. The organic solution now contained crystals of the macrocycle in complex form.

EXAMPLE 7

A 0.1 molar solution of $K_2CrO_4$ in water was prepared, and the pH of the solution adjusted to approximately 1.0 with HCl. A 0.015 molar solution of dibenzo-18-crown-6 macrocyclic polyether in methylene chloride was prepared, and approximately equal volumes of the two immiscible solutions were brought into contact and shaken for a few seconds. The organic solution now contained 96% of macrocycle in complex form.

EXAMPLE 8

A 0.5 molar solution of $K_2CrO_4$ in water was prepared, and the pH of the solution adjusted to 0.2 with $HNO_3$. A 0.0004 molar solution of dicyclohexyl-18-crown-6 macrocyclic polyether in methylene chloride was prepared, and approximately equal volumes of the two immiscible solutions were brought into contact and shaken for a few seconds. The organic solution now contained 58% of macrocycle in complex form.

EXAMPLE 9

A 0.5 molar solution of $K_2CrO_4$ in water was prepared, and the pH of the solution adjusted to approximately 0.2 with $CrO_3$. A 0.0004 molar solution of dicyclohexyl-18-crown-6 in methylene chloride was prepared and approximately equal volumes of the two immiscible solutions were brought into contact and shaken for a few seconds. The organic solution now contained 61% of macrocycle in complex form.

EXAMPLE 10

A 0.50 molar solution of $K_2CrO_4$ in water was prepared, and the pH of the solution adjusted to 0.65 with HCl. A 0.001 molar solution of dicyclohexyl-18-crown-6 macrocyclic polyether in methylene chloride was prepared, and approximately equal volumes of the two immiscible solutions were brought into contact and shaken for a few seconds. The organic solution now contained 98% of macrocycle in complex form.

EXAMPLE 11

A 0.50 molar solution of $K_2CrO_4$ in water was prepared, and the pH of the solution adjusted to approximately 4.1 with HCl. A 0.001 molar solution of dicyclohexyl-18-crown-6 macrocyclic polyether in methylene chloride was prepared, and approximately equal volumes of the two immiscible solutions were brought into contact and shaken for a few seconds. The organic solution now contained 50% of macrocycle in complex form.

EXAMPLE 12

A 0.50 molar solution of $K_2CrO_4$ in water was prepared, and the pH of the solution adjusted to 7.3 with HCl. A 0.001 molar solution of dicyclohexyl-18-crown-6 macrocyclic polyether in methylene chloride was prepared, and approximately equal volumes of the two immiscible solutions were brought into contact and shaken for a few seconds. The organic solution now contained 12% of macrocycle in complex form.

EXAMPLE 13

A saturated solution of $K_2CrO_4$ in water was prepared, and the pH of the solution adjusted to 1.0 with $H_2SO_4$. A 0.2 molar solution of dicyclohexyl-18-crown-6 macrocyclic polyether in methylene chloride was prepared, and approximately equal volumes of the two immiscible solutions were brought into contact and shaken for a few seconds. The organic solution now contained 61% of macrocycle in complex form.

EXAMPLE 14

A 0.6 molar solution of $K_2CrO_4$ in water was prepared, and the pH of the solution adjusted to approximately 0.45 with $H_2SO_4$. A 0.1 molar solution of 18-crown-6 macrocyclic polyether in methylene chloride was prepared, and approximately equal volumes of the immiscible solutions were brought into contact and shaken for a few seconds. The organic solution now contained crystals of macrocycle in complex form.

EXAMPLE 15

A 0.5 molar solution of $K_2CrO_4$ in water was prepared, and the pH of the solution adjusted to 0.2 with HCl. A 0.7 molar solution of 18-crown-6 macrocyclic polyether in methylene chloride was prepared, and approximately equal volumes of the two immiscible solutions were brought into contact and shaken for a few seconds. The organic solution now contained crystals of macrocycle in complex form.

Since the hexavalent chromium-containing complexes described hereinabove exhibit solubility in low polarity solvents, such as methylene chloride, relatively low concentrations of soluble chromate may be employed in the coating formulations, obviating the need for high loadings of zinc chromate or strontium chromate which are typically dispersed into primer vehicles by milling. In the present invention the soluble chromate is homogeneously distributed throughout the coating as a solid solution which is effective in providing corrosion protection, since a continuous gradient of hexavalent chromium is available for transfer to the metal surface. The magnitude of protective leaching from such a coating may approximate that of conventional primer films, notwithstanding their heavy chromate pigmentation. Conventional primers isolate dispersed pigment particles by the vehicle so that no continuity of the leaching mechanism exists once the particles exposed at the surface are exhausted. The following experiment illustrates the practical application of the soluble chromate as a wet paint additive:

a. The following panels (approximately 3 × 6 × 0.20 inches) were abraded and degreased:

| Code No. | Substrate | Federal Specification |
|---|---|---|
| 1 | Magnesium Alloy | QQ-M-44 |
| 2 | Mild Steel | MIL-S-7952 |
| 3 | Aluminum 7075 Alloy, Unclad | QQ-A-250/2 |

b. Preparation of concentrated soluble chromate:

14.7 gm of dicyclohexyl-18-crown-6 macrocyclic polyether was dissolved in 200 ml of methylene chloride yielding a 0.2 molar solution. This solution was used to extract 200 ml of a saturated aqueous potassium chromate solution which had been adjusted to a pH of 1.0. A 1 ml aliquot of the separated organic phase indicated 61% complexation. The remaining 199 ml of the separated organic phase was then concentrated in a rotary evaporator at 22° centigrade/5mm pressure, and the syrupy residue consisting of macrocyclic complexed potassium chromate was thinned with methylene chloride to form a 67% solution of concentrate in methylene chloride.

c. Modification of wet paint with concentrate solution:

A white gloss enamel (Federal Specification TT-E-489F) was modified at two levels with the 67% concentrate solution. In modification "A", 5.4 grams of the concentrate solution was mixed with 140 ml of wet paint yielding a concentration of 0.2 pounds of the concentrate per gallon of wet paint. In modification "B", 13.5 grams of the concentrate solution was mixed with 140 ml of wet paint yielding a concentration of 0.5 pounds of the concentrate per gallon of wet paint. Portion "C" was the unmodified wet paint used as a control. Modifications "A" and "B" were made within 15 minutes of spray application to the unprimed substrates described above. Each of the three coatings was applied to two samples. The coatings were air dried at room temperature for two weeks, then scribed with an "X" on the substrate metal, sealed on a reverse side, and waxed on the edges. The panels were then placed in a 5% salt fog chamber in accordance with method 6061 of Federal Test Method Standard No. 141, except that they were inclined at 6° to the vertical.

d. Results:

Substrates coated with enamel to which the soluble chromate had been added exhibited marked superiority over the similar substrates with the unmodified enamel in providing corrosion protection to the unprimed magnesium, steel and aluminum substrates respectively, after 200, 530, and 1680 hours of salt spray exposure.

Some of the many advantages of applicants' invention should now be readily apparent from the foregoing description. The examples described represent the first known solubilization of the chromate ion in non-polar organic media by virtue of pH control of the hexavalent chromium salt containing solution. Once solubilized and isolated, the chromate ion resulted in superior corrosion inhibition and protection to metal surfaces such as steel, magnesium and aluminum when added directly into a wet paint system used to coat the metals. Great savings in man-hours of time necessary to apply primer coats to metal surfaces can be effected by adding the complexed chromate ion directly into the paint, thus producing substantial economies. Concomitantly, great savings in application time are also effected by eliminating the intermediate step of applying a primer coat. Finally, the dissolved chromate ion provides superior protection against corrosion over the dispersed forms of the chromate ion presently used in primers, by dissolving into moisture areas on the metal.

Obviously, many modifications and variations of the present invention are possible in light of the above teachings. For example, other hexavalent chromium-containing salts along with other appropriate macrocyclic polyethers, and non-polar organic solvents could be used with equally predictable successful results. It is therefore to be understood that within the scope of the appended claims, the invention may be practiced otherwise than as specifically described.

What is claimed is:

1. A corrosion inhibitor for mixing with an organic medium, produced by the process comprising:

contacting an aqueous solution of hexavalent chromium-containing potassium salt with an organic solution of 18-crown macrocyclic polyether selected from the group consisting of dibenzo-18-crown-6; dicyclohexyl-18-crown-6 and 18-crown-6 macrocycles until equivalent molar amounts of said salt and said polyether are complexed in said organic solution, said aqueous solution having a molarity essentially from 0.1 mol to saturation and an acidic pH, and said organic solution having a molarity essentially from 0.0004 mol to 0.7 mol; and separating said organic solution containing said complexed salt and polyether and forming thereby said inhibitor.

2. A corrosion inhibitor as set forth in claim 1 wherein the acidic pH is obtained by adding to said aqueous solution an acid selected from the group consisting of hydrochloric, nitric, chromic and sulfuric acids.

3. An inhibitor as set forth in claim 2 wherein said acid is hydrochloric.

4. An inhibitor as set forth in claim 2 wherein said acid is nitric.

5. An inhibitor as set forth in claim 2 wherein said acid is chromic.

6. An inhibitor as set forth in claim 2 wherein said acid is sulfuric.

7. An inhibitor as set forth in claim 1 wherein said macrocycle is dibenzo-18-crown-6.

8. An inhibitor as set forth in claim 1 wherein said macrocycle is dicyclohexyl-18-crown-6.

9. An inhibitor as set forth in claim 1 wherein said macrocycle is 18-crown-6.

10. A process for producing a corrosion inhibitor for mixing with an organic medium comprising the steps of:

preparing an aqueous solution of hexavalent chromium-containing potassium salt, said aqueous solution having a molarity essentially from 0.1 mol to saturation and an acidic pH;

preparing an organic soltuion of 18-crown macrocyclic polyether selected from the group consisting of dibenzo-18-crown-6, dicyclohexyl-18-crown-6 and 18-crown-6 macrocycles in a low polarity organic solvent, said organic solution having a molarity essentially from 0.0004 mol to 0.7 mol;

contacting said aqueous solution with said organic solution until equivalent molar amounts of said salt and said polyether are complexed in said organic solution; and separating said organic solution containing said complexed salt and polyether and forming thereby said inhibitor.

11. A process as set forth in claim 10 wherein the acidic pH is obtained by adding to said aqueous solution an acid selected from the group consisting of hydrochloric, nitric, chromic and sulfuric acids.

12. A process as set forth in claim 11 wherein said acid is hydrochloric.

13. A process as set forth in claim 11 wherein said acid is nitric.

14. A process as set forth in claim 11 wherein said acid is chromic.

15. A process as set forth in claim 11 wherein said acid is sulfuric.

16. A process as set forth in claim 10 wherein said macrocycle is dibenzo-18-crown-6.

17. A process as set forth in claim 10 wherein said macrocycle is dicyclohexyl-18-crown-6.

18. A process as set forth in claim 10 wherein said macrocycle is 18-crown-6.

19. A process for protecting a metal surface from corrosion comprising the steps of:

preparing an aqueous solution of hexavalent chromium-containing potassium salt, said aqueous solution having a molarity essentially from 0.1 mol to saturation and an acidic pH;

preparing an organic solution of 18-crown macrocyclic polyether selected from the group consisting of dibenzo-18-crown-6, dicyclohexyl-18-crown-6 and 18-crown-6 macrocycles in a low polarity organic solvent, said organic solution having a molarity essentially from 0.0004 mol to 0.7 mol;

contacting said aqueous solution with said organic solution until equivalent molar amounts of said salt and said polyether are complexed in said organic solution;

separating said organic solution containing said complexed salt and polyether and forming thereby said inhibitor;

mixing said organic solution with a wet paint in an amount sufficient to produce a concentration of macrocyclic complexed hexavalent chromium-containing potassium salt in the wet paint of not less than 0.2 lb/gallon; and applying said modified wet paint to the metal surface.

20. A process as set forth in claim 19 wherein the acidic pH is obtained by adding to said aqueous solution an acid selected from the group consisting of hydrochloric, nitric, chromic and sulfuric acids.

21. A process as set forth in claim 20 wherein said acid is hydrochloric.

22. A process as set forth in claim 20 wherein said acid is nitric.

23. A process as set forth in claim 20 wherein said acid is chromic.

24. A process as set forth in claim 20 wherein said acid is sulfuric.

25. A process as set forth in claim 19 wherein said macrocycle is dibenzo-18-crown-6.

26. A process as set forth in claim 19 wherein said macrocycle is dicyclohexyl-18-crown-6.

27. A process as set forth in claim 19 wherein said macrocycle is 18-crown-6.

* * * * *